No. 779,548. PATENTED JAN. 10, 1905.
K. KIEFER.
FILTER PULP PACKING MACHINE.
APPLICATION FILED JUNE 22, 1903.
2 SHEETS—SHEET 2.
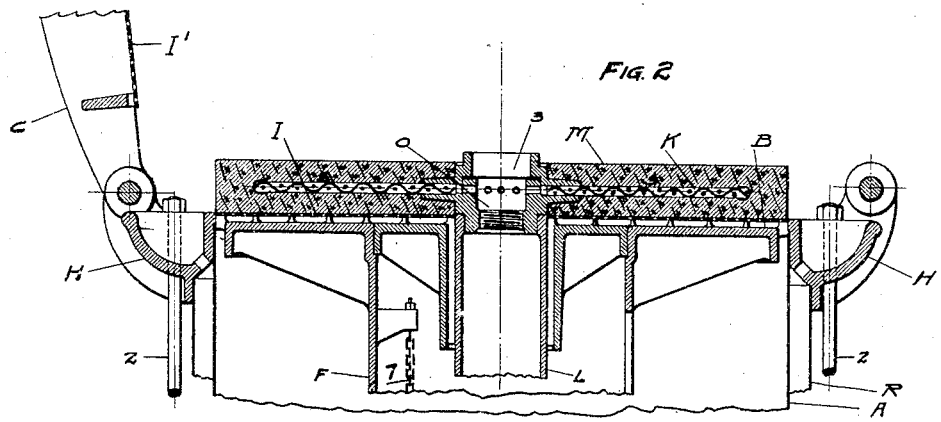
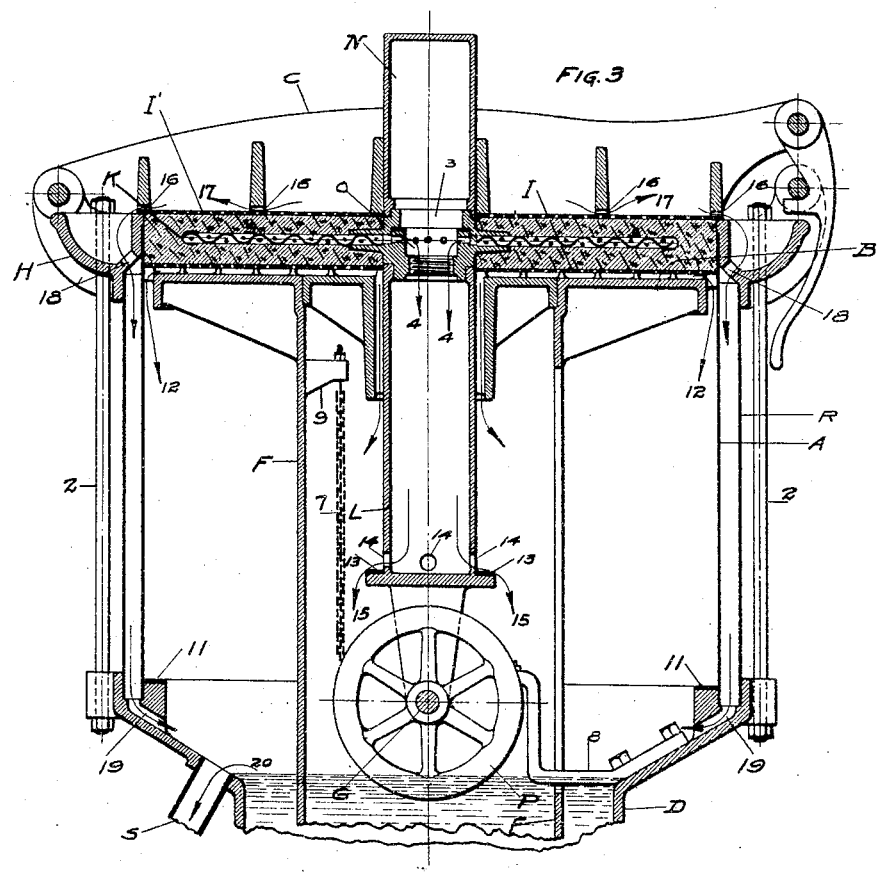
Witnesses
H. L. Rambeau
G. W. Worden
Inventor
Karl Kiefer No. 779,548. Patented January 10, 1905.

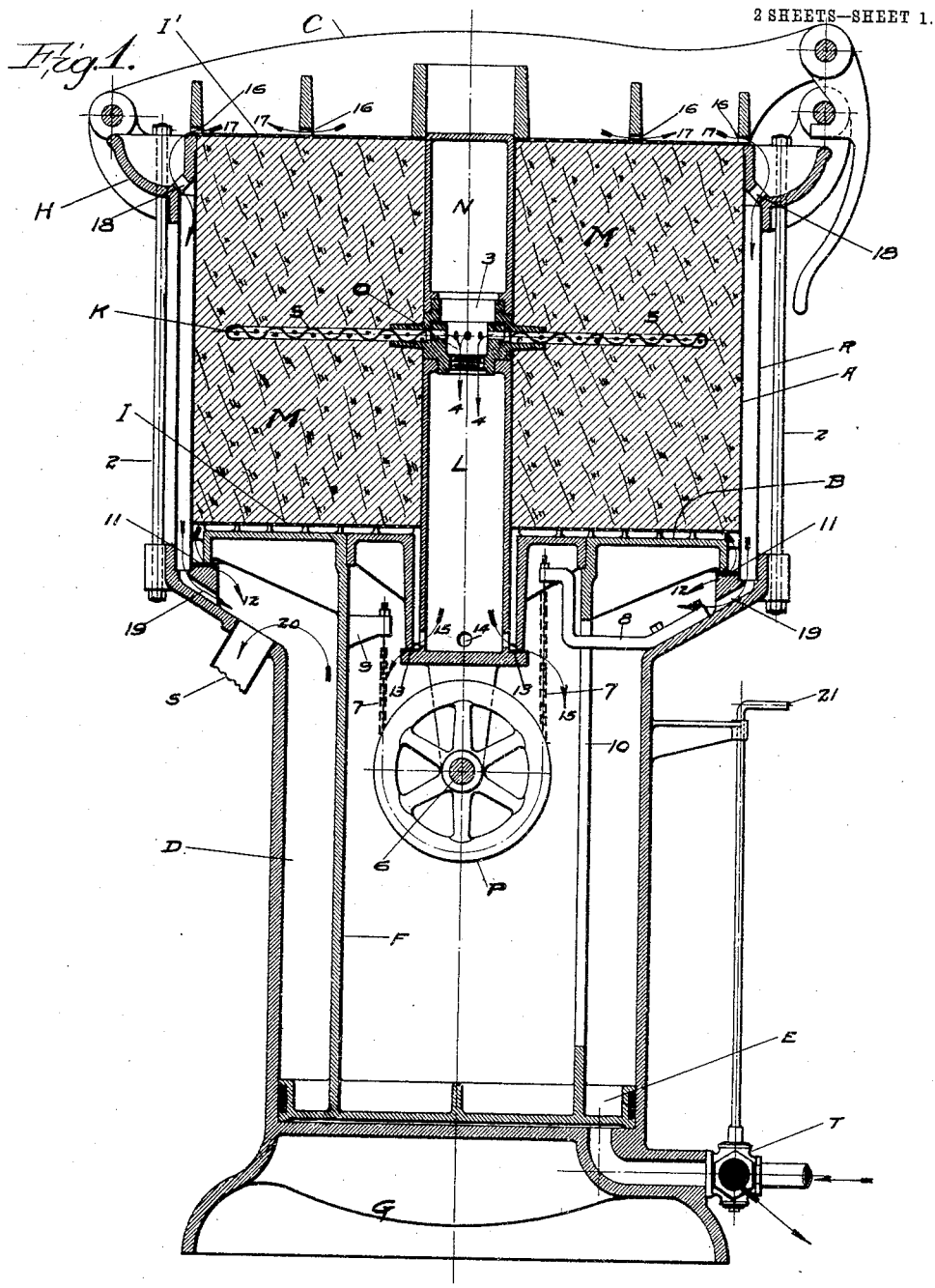

UNITED STATES PATENT OFFICE.

KARL KIEFER, OF CINCINNATI, OHIO.

FILTER-PULP-PACKING MACHINE.

SPECIFICATION forming part of Letters Patent No. 779,548, dated January 10, 1905.

Application filed June 22, 1903. Serial No. 162,608.

*To all whom it may concern:*

Be it known that I, KARL KIEFER, a citizen of the United States, and a resident of Cincinnati, in the county of Hamilton and State of Ohio, have invented certain new and useful Improvements in Filter-Pulp-Packing Machines, of which the following is a specification.

This invention has for its purpose the enveloping of a disk-shaped liquid-conductor from all sides with a compressed filtering material, such as paper-pulp, asbestos, &c. Generally such plates have a metal center core which serves for the admission or exit of the liquid to be filtered; and the purpose of this machine is also to spare out the center opening within the otherwise continuous enveloping filtering layer.

Heretofore when a continuous filtering layer enveloping a disk-shaped liquid-conductor was wanted such a filtering layer has been substantially produced, making two filtering layers with the dividing-line on the plane of the disk. The disadvantage of this proceeding consisted in that the filtering layer produced by two separate layers did not form a perfect homogeneous filtering medium, as the fibers of the filtering material could not interlace with each other after one of the layers had been compressed, as could have been the case if the fibers of each filtering layer at the time of compression were yet in a diffused state within the solvent. Characteristic, therefore, of my new invention is that the final pressure upon the filtering medium will be exerted while all the pulp fibers are yet in a like condition of diffusion.

My invention is illustrated in the accompanying drawings.

Figure 1 is a cross-section through the entire machine, showing all its parts. Fig. 2 is a cross-section through a part of the machine, showing the finished disk covered with pulp. Fig. 3 shows the same disk in its completion, however, before the cover of the machine has been raised.

The center lines through Figs. 1, 2, and 3 denote, as customary, that all parts shown in cross-sections and symmetrical in regard to these central lines are rotatoids, and being plane I have not deemed it necessary to show any top views, which in this case would result in nothing but a lot of circles, rather detracting than adding to the understanding of the invention.

The machine, which I will call a "packing-machine," consists principally of a sheet-iron cylinder A, press-plate B, and cover C. Within these three parts the filtering mass M is poured in its diffused state, the solvent being usually water. The motive power that is to compress the filtering mass M to a state of substantial dryness is shown to be a hydraulic press arrangement consisting of a cylinder D and a plunger E. The press-plate B and the hydraulic plunger E are connected by a tubular connection-piece F. The hydraulic cylinder D forms the frame upon which the whole packing-machine is mounted. It has a bottom part G, containing an opening for the admission and discharge of the pressing fluid. The upper part of D carries the cylinder A clamped to it by means of a cast-iron ring H, this latter containing the hinges for the cover C, bolts 2 securing connection between ring H and hydraulic cylinder D. The press-plate B and the cover C are provided with perforated plates I I. These perforated plates are covered with a finer wire screen, fine enough to retain the pulp fibers, as is usual in such packing-presses. In order to condense the filter mass M to an enveloping cake of the form shown in Fig. 2, it is evident that one of the first requirements is that the pressure upon the filtering mass should be arranged in such a manner that the layer above the disk-shaped screen K should be compressed to the same density and should contain as many fibers as the layer below the screen K. This screen K is rigidly connected to the central hub O, having a central opening 3, with which outlet-openings 4 connect. The screen K, with central hub O, I will hereinafter call by the name of "liquid-conductor." This part forms the outlet liquid-way for the double filter layer in which it is embedded. Now through all the stages of compression this liquid-conductor should be kept within the center height between the cover C and the press-plate B. In my arrangement as shown in Fig. 1 the cover is shown as stationary during the act of compression of the filtering medium. The press-plate B by means of the hydraulic plunger E is forced upward until it has reached a position as shown in Fig. 3. In order, therefore, to keep the liquid-conductor during all the stages of compression in an equidistant position between C and B, it is necessary, as one sees after short contemplation, that the liquid-conductor should travel upward with one-half the speed of press-plate B. In other words, when press-plate B travels two inches upward the liquid-conductor travels one inch upward, and consequently will always occupy a relatively middle position between the stationary cover C and the press-plate B.

The final act of compression is shown in Fig. 3, with the liquid-conductor still equidistant from the cover C and the press-plate B. The arrangement by which this relative motion of the liquid-conductor is attained is as follows:

The liquid-conductor by means of its central hub O is supported by a cylindrical tube L, which can move longitudinally in a central hole in the press-plate B. This cylinder L is of the diameter of the hole intended to be spared out from the filter layer. A similar hole is to be spared out from the top layer by means of a cylinder $n$. The top cylinder N fits into a hole of the cover C so it can move longitudinally therein. The cylinder L has an opening in its top, and in it fits hub O, clamped around the filter-disk proper, K. The top cylinder N fits into similar recesses of hub O. The screen K is covered with a fine-fiber retaining-cloth 5, Fig. 1, and it is easily seen that the solvent of the filtering mass can enter into the screen K, penetrate into the interior of the hub O, and be conducted from there in the direction of the arrows 4 downward. Its final exit I will later on describe.

The lower cylinder L is rigidly connected with the sheave-wheel P, which latter also rotates on its axis 6. The chain 7 is swung around this sheave-wheel P and is on one side held by bracket 8, rigidly connected by screws with the frame part D. The other end of the chain is connected with the bracket 9, rigidly connected to the cylindrical frame connection F. This frame connection F is intersected by a longitudinal channel 10, through which the bracket 8 protrudes within the interior of the cylindrical part F. This mechanical arrangement produces the desired mechanical motion—namely, to retard the upward motion of the cylinder L in proportion of one to two of the motion of the press-plate B.

In my new improved apparatus I dissolve the mass M in so much water that by its great diffusion the paper-pulp will evenly distribute itself within the whole cylinder A.

If the packing-machine acquires large proportions, it is not possible to supply this liquid mass fast enough, at the same time preventing the flowing away of a great amount of water over the porous surface of the liquid-collector K and the porous press-plate B. I therefore have provided means in order to close the whole container A by means of valves and gaskets and make it a water-tight receptacle for the time it takes to completely fill A with the dissolved filtering medium. It may be seen that the press-plate B sits on a circular gasket 11, which prevents the flowing of the water in the direction of the arrows 12 as long as the press-plate B is seated as shown in Fig. 1. Another gasket, 13, closes the central opening of the press-plate B by means of an annular projection of the cylinder L, which supports gasket 13 in the position as shown in Fig. 1, preventing the liquid collecting in the interior of the liquid-conductor from egress through holes 14, as shown in the direction of arrows 15. It is evident that the moment the press-plate B is raised it lifts itself from the gaskets 11 and 13, and the separation of the water from the pulp by straining is not any more hindered, as shown in Fig. 3. The water in going over the porous cover flows through the holes 16 in the direction of the arrows 17, overflows the ring-shape frame part H, and from there to the holes 18 into the space produced by cylinder A, and another cylinder R of larger diameter than A, from there through the perforations 19 in the larger diameter than A, from there through the perforations 19 in the main frame part D, and collects from there together with other particles of water, within the main frame-cylinder D. It collects all above the hydraulic piston E, which at its upward motion elevates the water until it overflows through the opening S in the direction of the arrows 20. The operation of the hydraulic piston is effected by a three-way cock T, operated by a handle 21. After the filtering medium has been compressed upon the disk, as shown in Fig. 3, it remains to show how the filtering element is taken out from the packing-machine. For this purpose the upper cylinder N is first removed by hand and the cover C opened and lifted up into a position partly indicated in Fig. 2. Thereupon the hydraulic plunger E, operated upon once more, raises the press-plate B and elevates the liquid-conductor on a level outside the cylinder A, where it can be removed by hand or other contrivances.

What I claim as my invention, and desire to secure by Letters Patent, is—

1. In a filter-pulp-packing machine, the combination of an exterior cylindrical body having a cover and bottom, of a longitudinally-movable central cylindrical body, and a liquid-conductor between cover and bottom.

2. In a filter-pulp-packing machine, the combination of a stationary exterior cylinder with a removable cover and a longitudinally-movable bottom part, means to move such bottom, of a central cylindrical body, and of a liquid-conductor located between the removable cover and the bottom part.

3. In a filter-pulp-packing machine, the combination of a stationary exterior cylinder having a longitudinally-movable bottom part, means to move said bottom, of a central cylindrical body, with a liquid-conductor located above the bottom part.

4. In a filter-pulp-packing machine, the combination of an exterior cylinder having a porous cover and bottom of a central cylindrical body, a liquid-conductor connecting only with one of said cylinders and interposed between cover and bottom, in combination with means for regulating during compression the distance of said liquid-conductor from the cover and bottom.

5. In a filter-pulp-packing machine, the combination of an exterior cylinder having a porous cover and bottom, a central cylindrical body, of a liquid-conductor connecting with one of said cylinders and interposed between cover and bottom, in combination with means for holding said liquid-conductor materially equidistant from cover and bottom during compression.

6. In a pulp-packing machine, the combination of an exterior cylindrical body having a cover and bottom, of a liquid-conductor between cover and bottom, in combination with means for holding said liquid-conductor materially equidistant from cover and bottom during compression.

7. In a pulp-packing machine, the combination of an exterior non-porous cylinder, with cover and bottom, a central cylindrical body and of a movable liquid-conductor between cover and bottom.

8. In a pulp-packing machine, the combination of an exterior non-porous cylinder with cover and bottom, of a central cylindrical body, a movable liquid-conductor of a diameter smaller than the exterior cylinder between cover and bottom.

9. In a pulp-packing machine, the combination of an exterior non-porous cylinder with cover and bottom, a central non-porous cylindrical body, and of a movable liquid-conductor between cover and bottom.

10. In a pulp-packing machine, the combination of an exterior cylinder with a removable cover, a bottom snugly fitting into said cylinder and longitudinally movable therein, of a liquid-conductor interposed between cover and bottom, with means of holding said liquid-conductor materially equidistant from cover and bottom during compression.

11. The combination with a stationary exterior cylinder of a removable cover, and movable piston-like bottom part, means for effecting such movement, of a central movable cylindrical body supporting a liquid-conductor, and means for holding said liquid-conductor materially equidistant from cover and bottom during compression.

12. The combination of a stationary exterior cylinder, with a removable cover and a movable bottom part, means to move such bottom, and a central cylindrical body consisting of two parts adapted to separate and receive between its parts a liquid-conductor of a diameter smaller than the exterior cylinder.

13. In a filter-pulp-packing machine, the combination of an exterior cylinder having a porous cover and bottom, a central cylindrical body, of a liquid-conductor of a diameter smaller than the exterior cylinder connecting with one of said cylinders, and interposed between cover and bottom, with means for regulating the distance of said liquid-conductor from the cover and bottom during compression.

14. In a filter-pulp-packing machine, the combination of an exterior cylinder having a porous cover and bottom, a central cylindrical body, of a liquid-conductor of a diameter smaller than the exterior cylinder, connecting with one of said cylinders and interposed between cover and bottom, with means of holding said liquid-conductor materially equidistant from cover and bottom during compression.

15. In a pulp-packing machine, the combination of an exterior stationary cylindrical body having a cover and bottom, of a liquid-conductor of a diameter smaller than the exterior cylinder between cover and bottom, in combination with means for regulating the distance of said liquid-conductor from the cover and bottom.

16. In a filter-pulp-packing machine, the combination of an exterior cylinder with a removable cover, a bottom snugly fitting into said cylinder and longitudinally-movable therein, of a liquid-conductor interposed between cover and bottom, and means for regulating the distance of said liquid-conductor from the cover and bottom, during compression.

17. In a filter-pulp-packing machine, the combination of an exterior cylinder with a removable cover, a bottom snugly fitting into said cylinder and movable therein, of a liquid-conductor of a diameter smaller than the exterior cylinder interposed between cover and bottom, and means for regulating the distance of said liquid-conductor from the cover and bottom.

18. In a filter-pulp-packing machine, the combination of an exterior cylinder with a removable cover, a bottom snugly fitting into said cylinder and movable therein, of a liquid-conductor of a diameter smaller than the exterior cylinder interposed between cover and bottom, with means for holding said liquid-conductor materially equidistant from cover and bottom during compression.

19. The combination with an exterior cylinder of a removable cover and movable piston-like bottom part, means for effecting such movement, of a liquid-conductor, and of means for regulating the distance of said liquid-conductor from the cover and bottom during compression.

20. The combination with an exterior cylinder of a removable cover and movable piston-like bottom part, means for effecting such movement, a liquid-conductor of a diameter smaller than the exterior cylinder, and of means for regulating the distance of said liquid-conductor from the cover and bottom during compression.

21. The combination with an exterior cylinder of a removable cover, and movable piston-like bottom part, means for effecting such movement, of a central movable cylindrical body supporting a liquid-conductor of a diameter smaller than the exterior cylinder.

22. The combination of a stationary exterior cylinder with a removable cover and a movable bottom part, means to move such bottom, and a central cylindrical body consisting of two parts adapted to separate and receive between its parts a liquid-conductor, thereby supported, with means for regulating the distance of said liquid-conductor from the cover and bottom during compression.

23. The combination of a stationary exterior cylinder with a removable cover and movable bottom part, means to move such bottom, and a central cylindrical body consisting of two parts adapted to separate and receive between its parts a liquid-conductor of a diameter smaller than the exterior cylinder.

24. The combination of a stationary exterior cylinder with a removable cover and a longitudinally-movable bottom part, means to move such bottom, a central cylindrical body consisting of two parts adapted to separate and receive between its parts a liquid-conductor.

25. In a filter-pulp-packing machine, the combination of an exterior cylindrical body having a cover and bottom, of a central cylindrical body, and of a liquid-conductor between cover and bottom.

26. In a filter-pulp-packing machine, the combination of a non-porous exterior cylinder, a bottom part longitudinally movable in relation to said cylinder and a central cylinder, and of a liquid-conductor located above the bottom part.

27. In a filter-pulp-packing machine the combination of an exterior non-porous cylinder, a porous bottom part longitudinally movable in relation to said exterior cylinder, means to move said bottom part, a central cylindrical body, and of a porous and removable cover.

28. In a filter-pulp-packing machine, the combination of a stationary interior non-porous cylindrical body having a removable porous cover, a porous bottom part fitting snugly into the exterior cylinder and longitudinally movable therein, a central cylinder, and a liquid-conductor of a diameter smaller than the exterior cylinder interposed between cover and bottom.

29. In a filter-pulp-packing machine the combination of an exterior non-porous cylinder having a porous bottom longitudinally movable within said cylinder, a central cylindrical body longitudinally movable in relation to said bottom, and of a liquid-conductor above the bottom part.

30. In a filter-pulp-packing machine the combination of an exterior cylinder, a cover, bottom and of means for preventing the flow of the solvent before compression.

In testimony whereof I have signed my name to this specification in the presence of two subscribing witnesses.

KARL KIEFER.

Witnesses:
H. L. RAMBEAU,
G. W. WERDEN.